United States Patent [19]
McBride et al.

[11] Patent Number: 5,094,066
[45] Date of Patent: Mar. 10, 1992

[54] POWER WASHER FOR ROTARY MOWERS

[76] Inventors: Roby C. McBride, P.O. Box 63, Rte. 2; Roger A. McBride, Rte. 1, Box 396B, both of Limestone, Tenn. 37681

[21] Appl. No.: 564,775

[22] Filed: Aug. 9, 1990

[51] Int. Cl.⁵ .................. A01D 34/64; A01D 55/00
[52] U.S. Cl. .............................. 56/295; 56/17.5; 56/320.1; 56/DIG. 20
[58] Field of Search .............. 56/295, 255, 320.1, 56/320.2, 17.5, 16.8

[56] References Cited

U.S. PATENT DOCUMENTS

| | | | |
|---|---|---|---|
| 2,936,563 | 5/1960 | Blume | 56/320.2 X |
| 2,957,295 | 10/1960 | Brown | 56/17.5 X |
| 2,984,061 | 5/1961 | Stabnau | 56/320.1 |
| 2,992,524 | 7/1961 | Stabnau | 56/320.1 |
| 3,214,893 | 11/1965 | Griffin | 56/320.2 |
| 3,535,862 | 10/1970 | Wittwer | 56/17.5 |
| 3,601,960 | 8/1971 | Buechler | 56/295 X |
| 3,648,446 | 3/1972 | Haapoja et al. | 56/320.2 |

Primary Examiner—Stephen J. Novosad

[57] ABSTRACT

A washing device for a rotary blade mowing machine having a rotary blade shroud having a top deck and a depending surrounding skirt providing a generally circular blade cavity, a drive shaft extending substantially centrally through the deck into the cavity, and a rotary blade affixed to the shaft for rotation thereby, the device comprising, a fluid slinger having a body member affixed to the shaft at a position between the cavity side of the deck and the blade and spaced from the cavity side, a diverter on the body member extending generally radially therefrom, the diverter having surface portions on its cavity side contoured with respect to the general plane of the cavity side of the deck to provide vertically oriented vector surface portions adapted to force contacting wash fluid toward the deck cavity side upon rotation of the shaft, the diverter also being provided with chute surface portions having throw axes directed generally radially toward the shroud skirt, and at least one wash fluid port in the shroud deck adapted to direct wash fluid onto the slinger.

5 Claims, 3 Drawing Sheets

POWER WASHER FOR ROTARY MOWERS

BACKGROUND OF THE INVENTION

1. Field of Invention

This invention concerns rotary mowning machines, both riding and walking types, typically employed to cut grass, weeds, brush or other vegetation, wherein, according to the present invention, washing means is provided to power water streams onto the inner walls of the blade shroud to wash away wet, loose vegetation or dirt before it hardens, or to break up and wash away clumps of dried grass or dirt, or other such debris which are typically formed on said inner walls and which typically are very difficult and inconvenient to remove, particulary from heavy riding mowers, the undersides of which are practically inaccessible.

2. Description of Related Art and Objects

Heretofore, washing devices for rotary mowers have been of the type which injects water into the mower blade cavity onto the blade or into the vicinity of the blade whereby the blade is expected to throw the water against the debris and wash it away. It has been found however, that the mower blade essentially atomizes the water and merely wets down much of the debris, especially where the debris has already hardened onto the underside of the cavity deck. Devices of this type are disclosed in U.S. Pat. Nos. 2,936,563; 2,984,061; 2,992,524; 3,040,990; 3,214,893; 3,535,862; and 3,648,446, the disclosures of which concerning general rotary mower structure and wash water inlet mechanisms to the mower blade cavity, useful in practising the present invention, are incorporated herein by reference.

Objects therefore of the present invention are: to provide a washing device for rotary mowers which is easy to use and highly effective in washing away difficult, hard packed mowing debris from the inner walls of the blade shroud; to provide such device for walking or riding mowers; to provide such device, in certain embodiments as modifications of the mower blade itself; and to provide such device which is readily mountable on conventional mowers without any significant structural modification thereof.

SUMMARY OF THE INVENTION

The above and other objects hereinafter appearing have been attained in accordance with the present invention which is defined in an operative mowing machine embodiment as comprising a rotary blade shroud having top deck means and depending surrounding skirt means providing a generally circular blade cavity, drive shaft means extending substantially centrally through said deck means into said cavity, rotary blade means affixed to said shaft means for rotation thereby, fluid slinger means having body means affixed to said shaft means at a position between the cavity side of said deck means and said blade means and spaced from said cavity side, diverter means on said body means extending generally radially therefrom, said diverter means having surface portions on its cavity side contoured with respect to the general plane of the cavity side of said deck means to provide vertically oriented vector surface means adapted to force contacting wash fluid toward said deck cavity side upon rotation of said shaft means, said diverter means also being provided with chute surface means having throw axes directed generally radially toward said shroud skirt, and wash fluid port means in said deck means adapted to direct wash fluid onto said slinger means.

In certain preferred embodiments:

(a) the diverter means comprises substantially equally radially spaced segments, at least one of which has the vertically oriented vector surface means thereon which is inclined toward the cavity side of the shroud deck to throw wash fluid thereagainst, and at least another of which is provided with said chute surface means;

(b) A wash fluid reservoir is provided on the mower and adapted to be fluid connected to the port means by valve means; and (c) the vector surface means and the chute surface means are affixed to or integrally formed on the cavity side of the mower blade means.

Further objects and advantages of the invention will become apparent from the following description and drawings which are not made to scale and wherein.

Figure 1:
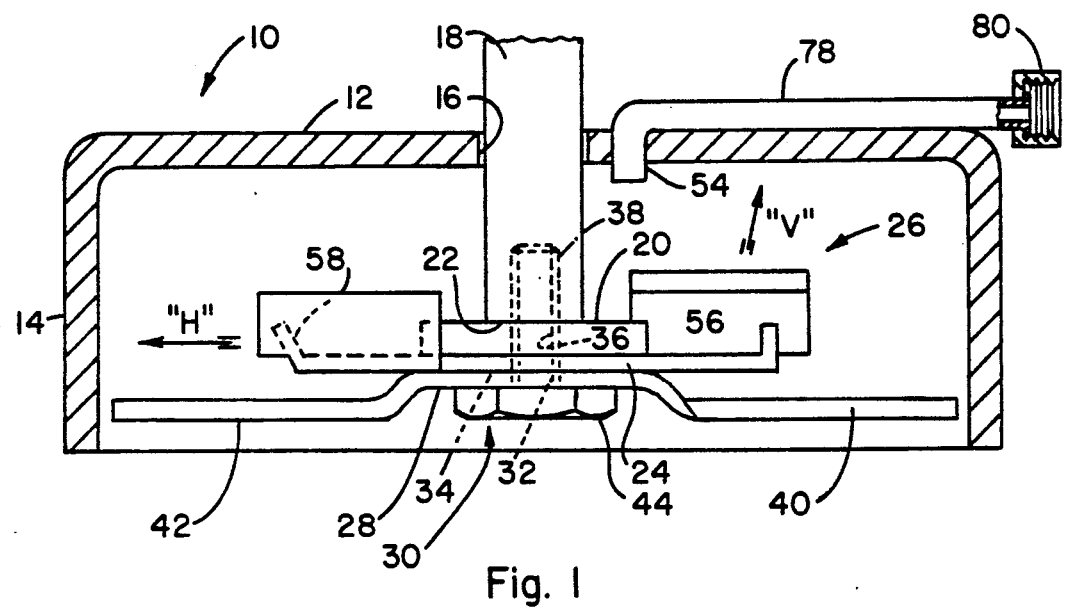
FIG. 1 is a cross-sectional side view of the blade shroud portion of a typical rotary mower showing one embodiment of the fluid slinger means.

Referring to the drawings, a mower blade housing generally designated 10 comprises a top deck 12 and a depending surrounding skirt 14, the deck being provided with drive shaft aperture 16 rotatably accommodating drive shaft 18. This shaft is typically either an extension of the motor crankshaft or is provided with a belt pulley or chain sprocket which is driven by a motor mounted in a location other than directly on the shroud deck. The shroud may have different shapes than shown, e.g., the skirt can be shorter or slanted or curved, which shapes are common to the art.

A heavy washer such as 20 may be positioned on the end 22 of the shaft to help support the body portion 24 of the present slinger generally designated 26, and the mower blade trunk 28 in cooperation with bolt 30 passing through apertures 32, 34 and 36 in the blade, slinger body and washer respectively and threaded at 38 into the shaft. The blade is provided with cutting segments 40 and 42 and the trunk 28 is preferably indented as shown to minimize contact of the bolt head 44 with the ground or other objects.

Figure 3:
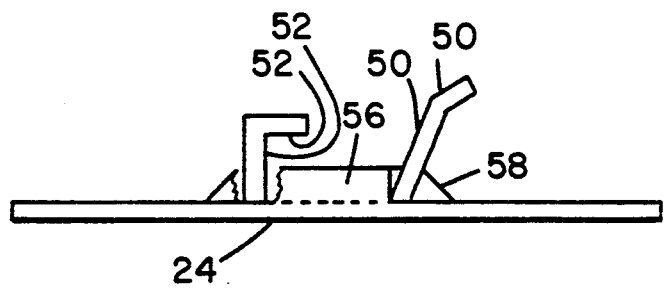
FIG. 3 is a side view, with portions broken away, of the slinger of FIG. 2 taken in the direction of the arrow "3"

The slinger is provided with any convenient number of radially spaced segments or diverter means of any of a variety of shapes such as 46 and 48 preferably integrally formed with body portion 24, at least one of which segments is provided with at least one vertically oriented vector surface means such as 50 and another segment with at least one chute surface means such as 52, each of which is shown in FIG. 3 as having two differently angled portions, but which, e.g., could also simply be curved to consist of one surface portion. The slinger may be in the form of a disc to which the diverter surfaces 50 and 52 can be affixed by spot welding or the like.

The function of the vertically oriented vector surfaces 50 is to direct portions of wash fluid, usually tap water, coming from inlet or port means 54 in deck 12 onto the upper surfaces of body portion 24, in generally vertically directed streams or jets "V" toward the deck without atomizing the fluid. The chute surfaces means 52 redirect portions of the fluid spouted onto the aforesaid upper surfaces in generally horizontal directions "H" toward the shroud skirt.

Figure 2:
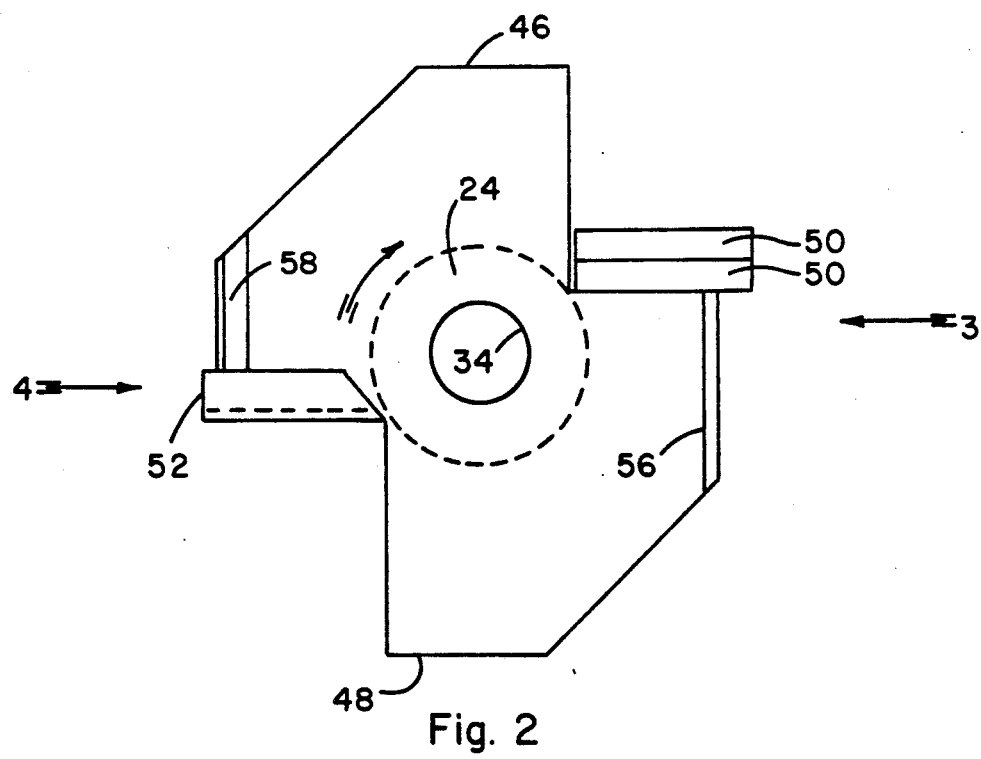
FIG. 2 is top elevational view of the slinger means of FIG. 1.

Referring to FIGS. 1–3, additional directing surfaces such as walls 56 and 58 may be provided to assist in providing adequate vertical and horizontal fluid jetting.

Figure 4:
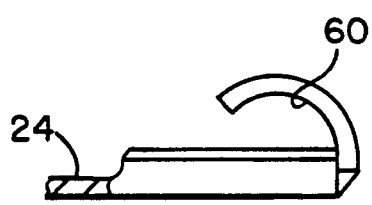
FIG. 4 is an end view of a slinger means showing a variation in the chute surface means as viewed in the direction of arrow "4" in FIG. 2.
Figure 5:
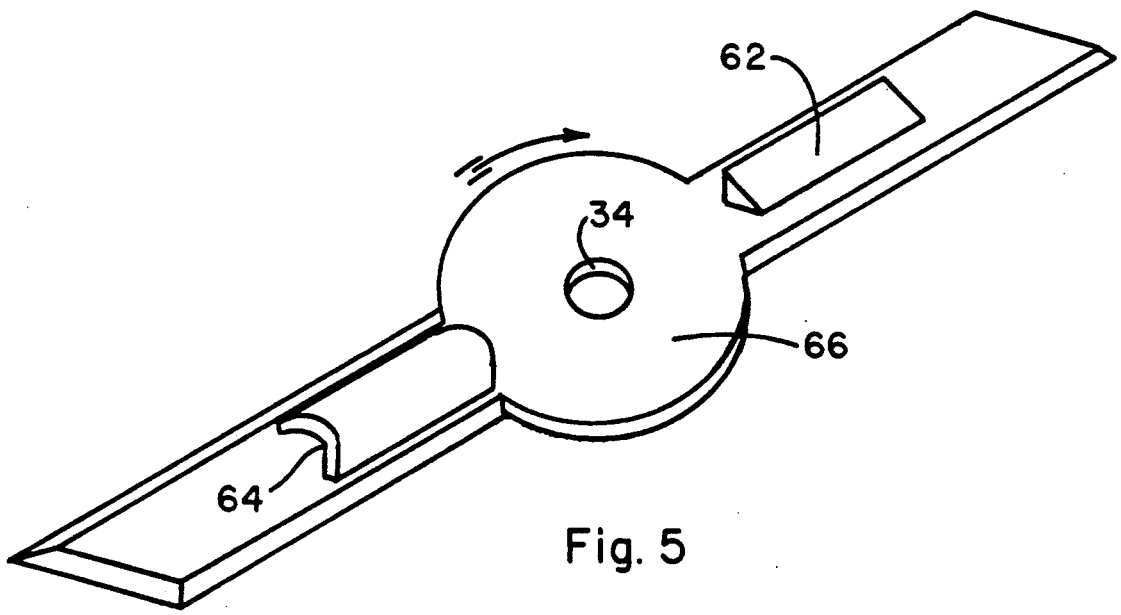
FIG. 5 is a perspective view of a conventional rotary mower blade modified with a variation of the present slinger integrally formed therewith or affixed thereto.
Figure 7:
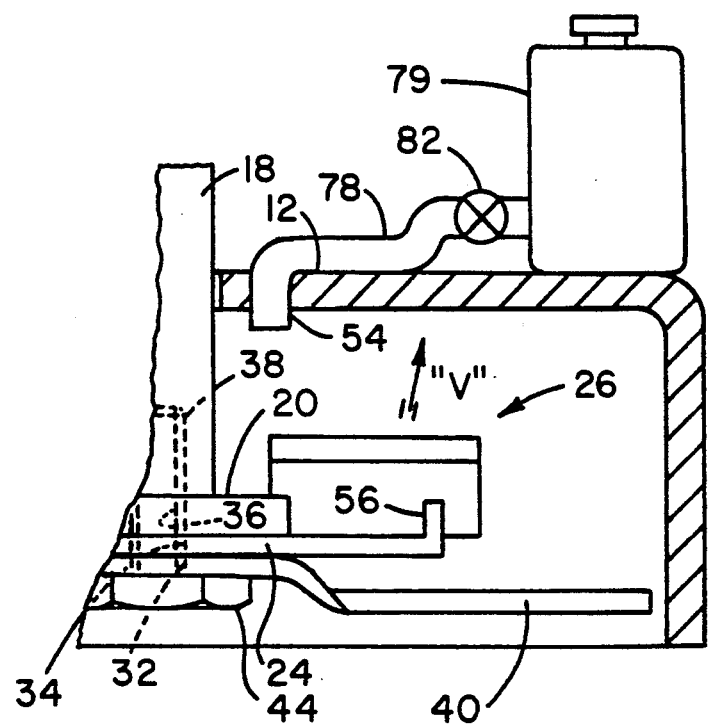
FIG. 7 is a portion of the view as in FIG. 1 showing a typical wash fluid reservoir which may be mounted on the mower housing deck for washing at a location remote from a wash-water source.

As shown in FIGS. 4 and 5, the chute surface 60 is given an arcuate cross-section to illustrate the variety of diverter configurations which may be employed. The slinger of FIGS. 1–3 is shown in a configuration which allows it to be stamped and formed readily from a piece of sheet metal such as 16 gauge galvanized steel or the like.

The embodiment of FIG. 5 is illustrative of a conventional mower blade having a generally vertically oriented surface 62 and an arcuate chute surface 64 provided by metal segments welded to the blade. In order to give a greater initial splash surface 66 for receiving fluid from inlet 54, the trunk portion of the blade may be enlarged as shown in the drawing, or a separate enlarged body piece equivalent to 24 could be mounted on top of the trunk portion 28 of the blade.

Figure 6:
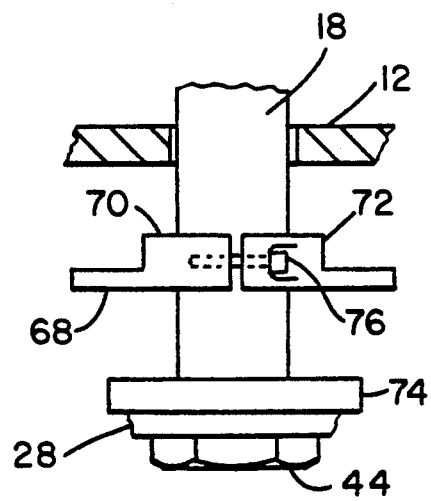
FIG. 6 is a side view of the washing device mounted on a headed drive shaft above the blade by a split collar.

In the embodiment of FIG. 6, the slinger body 68 is split in half and provided with split collar segments 70 and 72 such that where the shaft has a permanently affixed outer blade mounting bearing 74, the slinger can still be mounted in any position on the shaft simply by tightening collar screws 76 positioned on opposite peripheral sides of the collar. Where bearing 74 is not permanently affixed to the shaft, a conventional set screw collar may be employed to affix the slinger to any portion of the shaft.

In the operation of the washing device, a conventional garden hose is connected to fluid inlet conduit 78 at hose fitting 80 in conventional manner and water run onto the slinger, usually for about one or two minutes. The slinger is rotated by the mower motor in a clockwise direction as shown in the drawings. It is noted that several inlets such as 54 may be provided and connected into conduit 78. The slinger throws or jets the water in solid or near solid streams against the shroud with a force many times that achieved by water splashed by the mower blade itself, which blade tends to atomize rather than redirect the fluid flow and which is essentially incapable of providing significant fluid jetting against the shroud skirt.

Alternatively, inlet or port 54 and conduit 78 may be connected into a reservoir 79 of any convenient size and configuration attached in any suitable manner, such as welding, to deck 12. A manually controlled valve 82 may be employed in conduit 78 to regulate wash fluid flow to port 54.

The invention has been described in detail with particular reference to preferred embodiments thereof, but it will be understood that variations and modifications will be effected within the spirit and scope of the invention.

I claim:

1. A washing device for a rotary blade mowing machine having a rotary blade shroud having top deck means and depending surrounding skirt means providing a generally circular blade cavity, drive shaft means extending substantially centrally through said deck means into said cavity, and rotary blade means affixed to said shaft means for rotation thereby, said washing device comprising fluid slinger means having body means affixed to said shaft means at a position between the cavity side of said deck means and said blade means and spaced from said cavity side, diverter means on said body means extending generally radially therefrom, said diverter means having surface portions on its cavity side contoured with respect to the general plane of the cavity side of said deck means to provide vertically oriented vector surface means adapted to force contacting wash fluid toward said deck means cavity side upon rotation of said shaft means, said diverter means also being provided with chute surface means having throw axes directed generally radially toward the shroud skirt, and wash fluid port means in said deck means adapted to direct wash fluid onto said slinger means.

2. The device of claim 1 wherein said diverter means comprises substantially equally radially spaced segments, at least one of which has the vertically oriented vector surface means thereon which is inclined toward the cavity side of the shroud deck to throw wash fluid thereagainst, and another of which has the chute surface means thereon.

3. The device of claim 1 wherein a wash fluid reservoir is provided on the mower and adapted to be fluid connected to the port means by valve means.

4. A fluid slinger for a rotary blade mowing machine having a shroud provided with a top deck and skirt forming a blade cavity, said slinger being adapted to be affixed to the mower drive shaft for rotation therewith, said slinger comprising a body member having aperture means for receiving a blade mounting bolt means, diverter means on said body member extending generally radially therefrom, said diverter means having surface portions on its cavity side contoured with respect to the general plane of the cavity side of said deck to provide vertically oriented vector surface means, and having chute surface means having throw axes directed generally radially to effect fluid stream jetting against the skirt of the mower shroud.

5. The slinger of claim 4 wherein the vector surface means and the chute surface means are affixed to or integrally formed on the cavity side of a mower blade.

* * * * *